(12) United States Patent
Toyama et al.

(10) Patent No.: US 8,503,589 B2
(45) Date of Patent: Aug. 6, 2013

(54) WIRELESS COMMUNICATION APPARATUS AND WIRELESS RECEPTION METHOD

(75) Inventors: Daisuke Toyama, Yokohama (JP); Yoshimasa Kusano, Yokohama (JP)

(73) Assignee: Kyocera Corporation, Kyoto (JP)

( * ) Notice: Subject to any disclaimer, the term of this patent is extended or adjusted under 35 U.S.C. 154(b) by 482 days.

(21) Appl. No.: 12/675,397

(22) PCT Filed: Aug. 28, 2008

(86) PCT No.: PCT/JP2008/065398
§ 371 (c)(1),
(2), (4) Date: Jul. 8, 2010

(87) PCT Pub. No.: WO2009/028604
PCT Pub. Date: Mar. 5, 2009

(65) Prior Publication Data
US 2010/0284497 A1    Nov. 11, 2010

(30) Foreign Application Priority Data
Aug. 29, 2007  (JP) ................................ 2007-223198

(51) Int. Cl.
*H04L 1/02* (2006.01)
*H04B 7/10* (2006.01)

(52) U.S. Cl.
USPC ........... 375/347; 375/267; 375/316; 370/334; 455/101

(58) Field of Classification Search
USPC ............ 375/267, 347, 316; 370/334; 455/101
See application file for complete search history.

(56) References Cited

U.S. PATENT DOCUMENTS

| | | | | |
|---|---|---|---|---|
| 2006/0234729 | A1* | 10/2006 | Murakami et al. | 455/462 |
| 2007/0127609 | A1* | 6/2007 | Kawada et al. | 375/347 |
| 2008/0030265 | A1* | 2/2008 | Ido et al. | 329/317 |

FOREIGN PATENT DOCUMENTS

| | | |
|---|---|---|
| CN | 1512693 | 7/2004 |
| JP | 2001-156738 | 6/2001 |
| JP | 2003-018081 | 1/2003 |
| JP | 2003-501971 | 1/2003 |
| JP | 2003-174390 | 6/2003 |
| JP | 2005-277767 | 10/2005 |
| WO | WO-00/76229 | 12/2000 |
| WO | WO-2004/082182 | 9/2004 |

OTHER PUBLICATIONS

International Search Report for PCT/JP2008/065398, mailed on Nov. 4, 2008, 1 page.

(Continued)

*Primary Examiner* — Ted Wang
(74) *Attorney, Agent, or Firm* — Duane Morris LLP

(57) ABSTRACT

A wireless communication apparatus, having a plurality of antennas 11-1 to 11-M and for diversity-combining signals received by the plurality of antennas 11-1 to 11-M, is provided with a combining information calculation unit 14 for calculating antenna combined amplitude and combining weights based on received power of the plurality of antennas 11-1 to 11-M, a combining unit 15 for weighting and combining the signals received by the plurality of antennas 11-1 to 11-M based on the combining weights calculated, and a decoding processing unit 16 for decoding a combined reception signal generated by the combining unit 15. It thereby improves fading durability of the decoding process by reducing influence of multipath fading caused by arrival waves with delays, even in a case of using only a small number of reception antennas, and maintains a stable reception condition consistently, as well as achieving downsizing of and reduction in cost of hardware.

9 Claims, 6 Drawing Sheets

OTHER PUBLICATIONS

Office Action from Japanese Patent Application No. 2007-223198, mailed on Mar. 29, 2011.

Office Action for Chinese Patent Application No. 200880104771.8, dated Apr. 26, 2012, 4 pages. (including English translation).

* cited by examiner

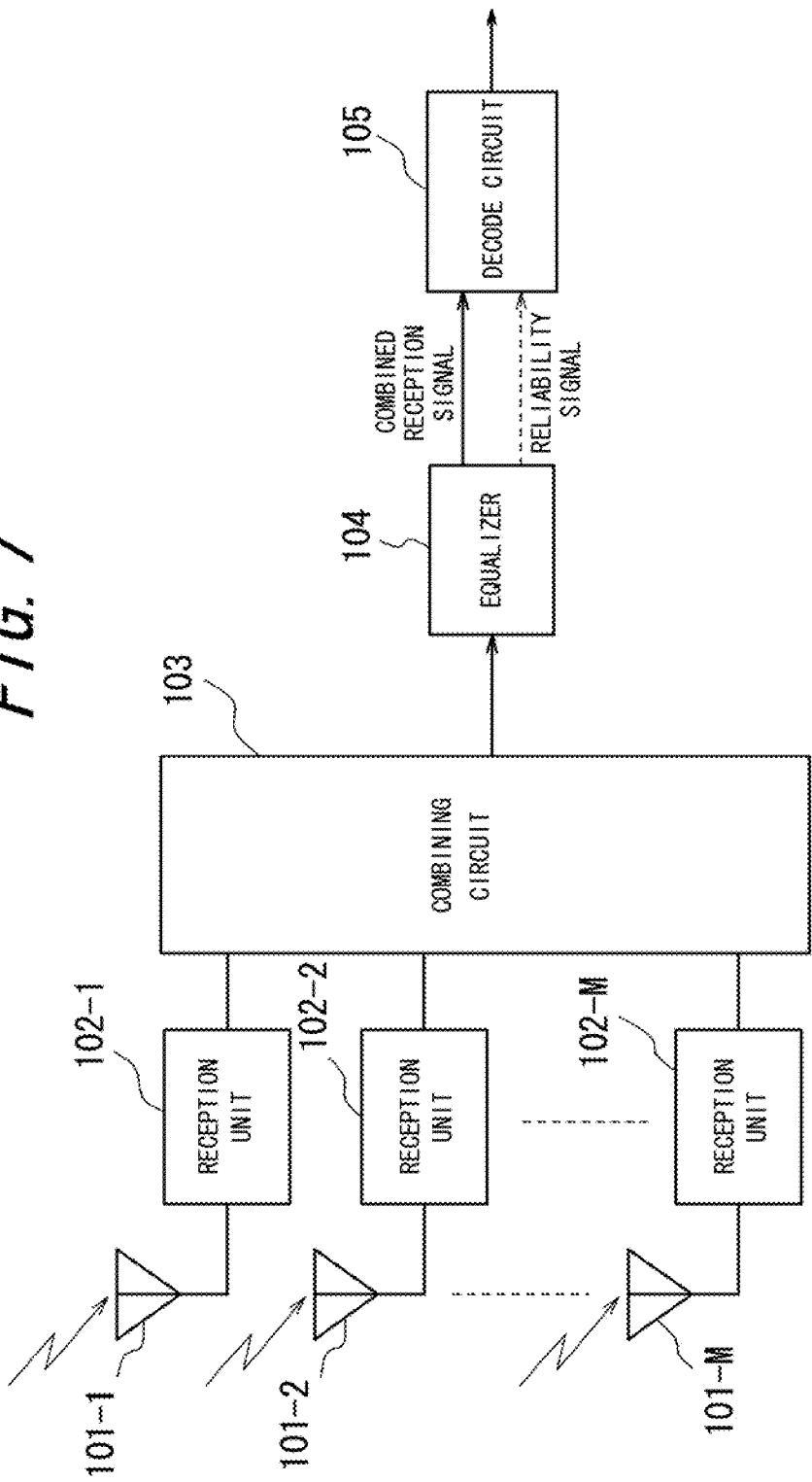

WIRELESS COMMUNICATION APPARATUS AND WIRELESS RECEPTION METHOD

CROSS REFERENCE TO RELATED APPLICATION APPLICATIONS

This application is a U.S. National Phase Application of International Application No. PCT/JP2008/065398, filed on Aug. 28, 2008, which claims priority to and the benefit of Japanese Patent Application No. 2007-223198, filed on Aug. 29, 2007, the entire contents of which are incorporated herein by reference.

TECHNICAL FIELD

The invention relates to a wireless communication apparatus and a wireless reception method for diversity-combining reception signals using a plurality of antennas.

BACKGROUND ART

A mobile wireless communication system generally uses a plurality of antennas so as to increase a reception gain by improving the reception performance at a base station and a mobile terminal station. Here, there is a fading as one of factors which cause deterioration of the reception performance. The fading is a phenomenon in which a radio signal transmitted from the base station or the mobile terminal station turns into multipath signals arriving through a number of paths due to reflection, refraction and scattering by buildings, vehicles, trees and the like existent between both stations. When such multipath fading occurs, the received power fluctuates at a reception antenna end. Thus, it has been adopted a countermeasure to reduce influence of the multipath fading by preparing a plurality of antennas at a reception side so as to increase received power.

FIG. 7 is a functional block diagram illustrating a schematic configuration of a main part of a conventional wireless communication apparatus reducing the influence of such multipath fading to increase a reception gain. The wireless communication apparatus is provided with a plurality of antennas 101-1 to 101-M. Arrival signals received by the antennas 101-1 to 101-M are reception-processed and an A/D-converted by corresponding reception units 102-1 to 102-M. Output signals from theses reception units 102-1 to 102-M are diversity-combined so as to maximize combined received power by a combining circuit 103, and the combined reception signal thus generated are equalized by an equalizer 104 and then error-corrected and decoded by a decode circuit 105.

As a method of combining a plurality of reception signals by the combining circuit 103, it is known, for example, by use of a known information signal inserted in the reception signals, to calculate antenna weight for each antenna minimizing an error of the phase of the known information signal received based on MMSE (Minimum Mean Square Error), correct the phase of the reception signal from each reception unit based on the antenna weight calculated, and combine the reception signals to obtain a combined reception signal having a sufficiently high SNR (Signal to Noise Ratio) (for example, see Patent Document 1).

In the conventional wireless communication apparatus shown in FIG. 7, the combining circuit 103 performs a primary equalizing process to correct the phase of each reception signal as a preprocessing for combining reception signals from reception units. Then, the equalizer 104 performs a secondary equalizing process on a combined reception signal based on the amplitude of the known information signal. In addition, the decoder circuit 105 performs error correction on the combined reception signal using reliability information (combined power), which is generated in the secondary equalizing process of the combined reception signal by the equalizer 104 and decodes the combined reception signal, and then outputs a result. Such a method for error correction using reliability information is disclosed in Patent Document 2, for example.

Patent Document 1: JP 2003-501971 T
Patent Document 2: WO 2004/082182

SUMMARY OF INVENTION

Technical Problem

However, with the method of combining reception signals by adopting MMSE in the above Patent Document 1, when arrival waves with delays due to multipath are mixed, interference waves having time differences relative to a main signal are superposed, leading to increase in dispersion of reception symbols.

As a result, sufficient SNR cannot be secured and reception performance is deteriorated. In wireless communication by multilevel modulation scheme such as QAM (Quadrature Amplitude Modulation), in particular, increase in dispersion of the reception symbol has a great influence and prevents proper reception, which may cause failure in a communication. Such influence by the multipath fading caused by arrival waves with delays becomes greater particularly when only a small number of the reception antennas are used.

Moreover, since it is necessary to adopt estimation algorithm including inversion matrix calculation in order to obtain the combined reception signal by MMSE, there is a concern about increase in a size of hardware and cost up thereof.

Therefore, in the view of the above problem, an object of the present invention is to provide a wireless communication apparatus and the wireless reception method capable of improving fading durability of a decoding process by reducing influence of the multipath fading caused by arrival waves with delays, even when a small number of the reception antennas are used, so as to maintain a stable reception condition consistently and achieve downsizing of and cost down of the hardware.

Solution to Problem

In order to achieve the above object, the invention according to a first aspect is characterized in that a wireless communication apparatus having a plurality of antennas and for diversity-combining signals received by the plurality of antennas includes:

a combining information calculation unit for calculating antenna combined amplitude and combining weights based on received power of the plurality of antennas;

a combining unit for generating a combined reception signal by weighting and combining signals received by the plurality of antennas based on the combining weights calculated by the combining information calculation unit; and a decoding process unit for decoding the combined reception signal generated by the combining unit based on the antenna combined amplitude calculated by the combining information calculation unit.

The invention according to a second aspect is characterized in that, in the wireless communication apparatus according to the first aspect, the combining information calculation unit calculates an antenna reliability ratio of each antenna, as the combining weight, based on the antenna combined amplitude and amplitude of received power corresponding to each antenna.

The invention according to a third aspect is characterized in that, in the wireless communication apparatus according to the first aspect, the signals received by the plurality of antennas to be combined by the combining unit are multilevel-modulated signals.

The invention according to a fourth aspect is characterized in that, in the wireless communication apparatus according to the second aspect, the signals received by the plurality of antennas to be combined by the combining unit are multi-level-modulated signals.

The invention according to a fifth aspect is characterized in that, in the wireless communication apparatus according to the first aspect, the signals received by the plurality of antennas to be combined by the combining unit are orthogonal frequency-division multiplexed signals.

The invention according to a sixth aspect is characterized in that, in the wireless communication apparatus according to the second aspect, the signals received by the plurality of antennas to be combined by the combining unit are orthogonal frequency-division multiplexed signals.

The invention according to a seventh aspect is characterized in that, in the wireless communication apparatus according to the third aspect, the signals received by the plurality of antennas to be combined by the combining unit are orthogonal frequency-division multiplexed signals.

The invention according to an eighth aspect is characterized in that, in the wireless communication apparatus according to the fourth aspect, the signals received by the plurality of antennas to be combined by the combining unit are orthogonal frequency-division multiplexed signals.

Moreover, in order to achieve the above object, the invention according to a ninth aspect is characterized in that a wireless reception method for diversity-combining signals received by a plurality of antennas includes:

a combining information calculation step for calculating antenna combined amplitude and combining weights based on received power of the plurality of antennas;

a combining step for generating a combined reception signal by weighting and combining signals received by the plurality of antennas based on the combining weights calculated at the combining information calculation step; and a decoding process step for decoding the combined reception signal generated at the combining step based on the antenna combined amplitude calculated at the combining information calculation step.

Advantageous Effects on Invention

According to the invention, antenna combined amplitude and combining weights are calculated based on received power of a plurality of antennas, and a combined reception signal is generated by weighting and combining the signals received by the plurality of antennas based on the combining weights calculated, and then the decoding process is performed to the combined reception signal generated, based on the antenna combined amplitude calculated. Therefore, it is possible to improve fading durability of the decoding process by reducing influence of multipath fading caused by arrival waves with delays, even in a case where only a small number of reception antennas are used, and maintain a stable reception condition consistently, as well as to downsize hardware and reduce cost thereof.

BRIEF DESCRIPTION OF DRAWINGS

FIG. 7 is a functional block diagram illustrating a schematic configuration of a main part of a conventional wireless communication apparatus.

| REFERENCE SIGNS LIST | |
|---|---|
| 11-1 to 11-M | antenna |
| 12-1 to 12-M | reception unit |
| 13-1 to 13-M | equalizer |
| 14 | combining information calculation circuit |
| 15 | combining circuit |
| 16 | decode circuit |
| 21 | symbol position determination circuit |
| 22 | depuncture |
| 23 | logarithmic likelihood ratio generation circuit |
| 24 | deinterleaver |
| 25 | iterative decoding process circuit |
| 26 | normalization process circuit |

DESCRIPTION OF EMBODIMENTS

Preferred embodiments of the invention will now be described with reference to the accompanying drawings.

Figure 1:
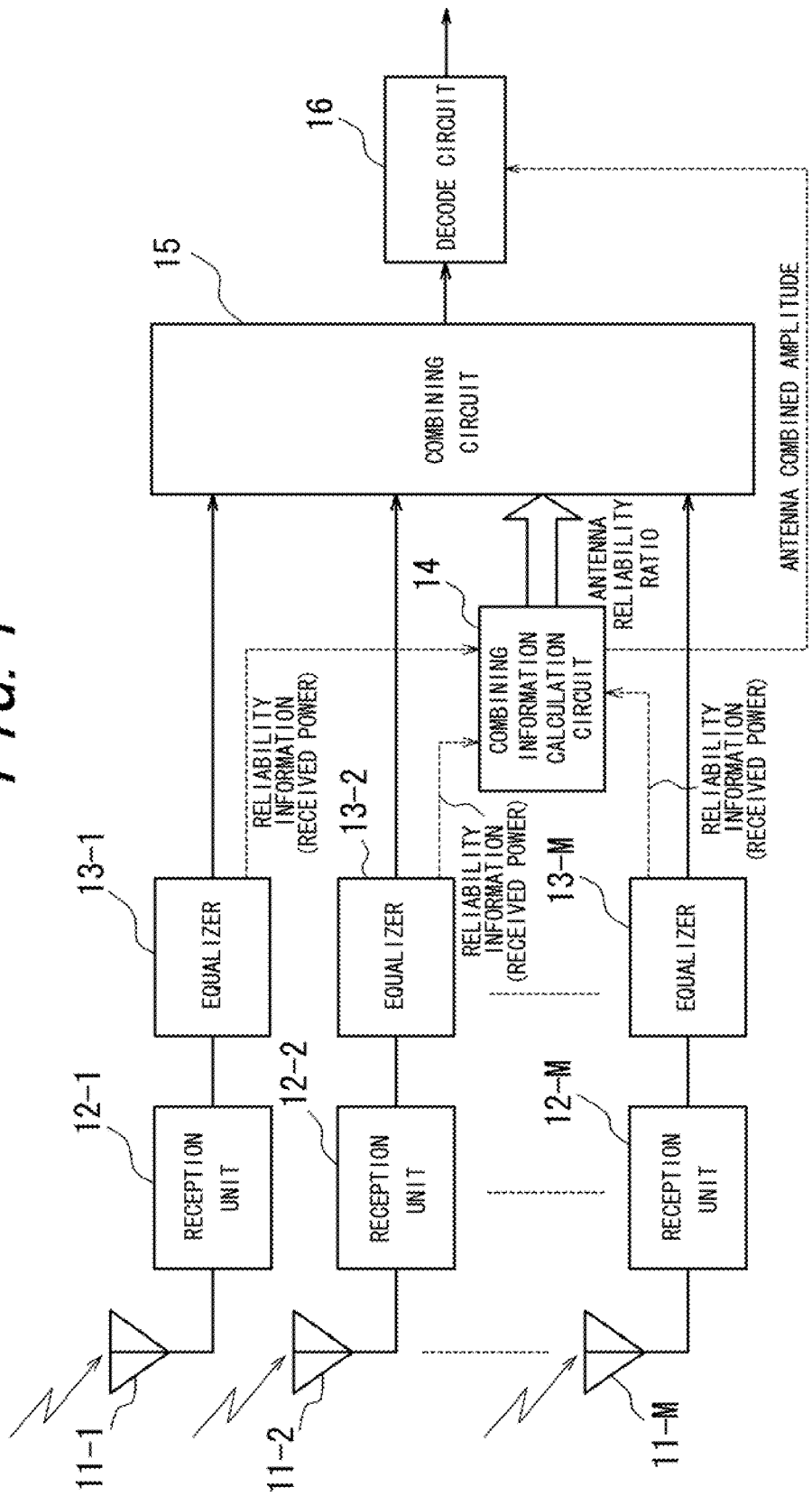
FIG. 1 is a functional block diagram illustrating a schematic configuration of a main part of a wireless communication apparatus according to an embodiment of the invention.

FIG. 1 is a functional block diagram illustrating a schematic configuration of a main part of a wireless communication apparatus according to an embodiment of the present invention. This wireless communication apparatus is provided with a plurality of antennas 11-1 to 11-M, reception units 12-1 to 12-M and equalizers 13-1 to 13-M which are corresponding to the antennas 11-1 to 11-M, a combining information calculation circuit 14, a combining circuit 15, and a decode circuit 16.

Arrival signals received by the antennas 11-1 to 11-M are reception-processed and A/D converted by the corresponding reception units 12-1 to 12-M, and then output. Output signals from the reception units 12-1 to 12-M are provided to the equalizers 13-1 to 13-M respectively.

Amplitude and phase of the arrival signals received by the antennas 11-1 to 11-M vary by influence of a multipath environment in a radio space. The wireless communication apparatus according to the present embodiment is provided with the equalizers 13-1 to 13-M corresponding to the reception units 12-1 to 12-M. Thereby, the wireless communication apparatus performs, using a known signal such as a training sequence or pilot symbols inserted in the arrival signals, for each reception path, channel estimation and equalization compensation independently to compensate variation of amplitude and phase of the arrival signals and generates reliability information (received power) of each antenna and reception signal of each antenna after equalization compensation.

The equalizers 13-1 to 13-M provide the reliability information generated to the combining information calculation circuit 14 and provide the reception signals after equalization compensation to the combining circuit 15. Based on the input reliability information of respective antennas, the combining information calculation circuit 14 calculates antenna combined amplitude and then provides it to the decode circuit 16, as well as calculating antenna reliability ratios for respective antennas, as combining weights, based on the antenna combined amplitude calculated and the reliability information of respective antennas, and then providing them to the combining circuit 15.

The combining circuit 15 generates a combined reception signal by weighting and combining the reception signals after equalization compensation from the equalizers 13-1 to 13-M based on the antenna reliability ratios (combining weights) of respective antennas from the combining information calculation circuit 14 and provides the combined reception signal to the decode circuit 16. The decode circuit 16 error-corrects and decodes the combined reception signal from the combining circuit 15 based on the antenna combined amplitude from the combining information calculation circuit 14.

The following is a more detailed description exemplifying a case where wireless communication of multicarrier modulation system is performed adopting OFDM (Orthogonal Frequency-Division Multiplexing) scheme as a communication method.

Figure 2:
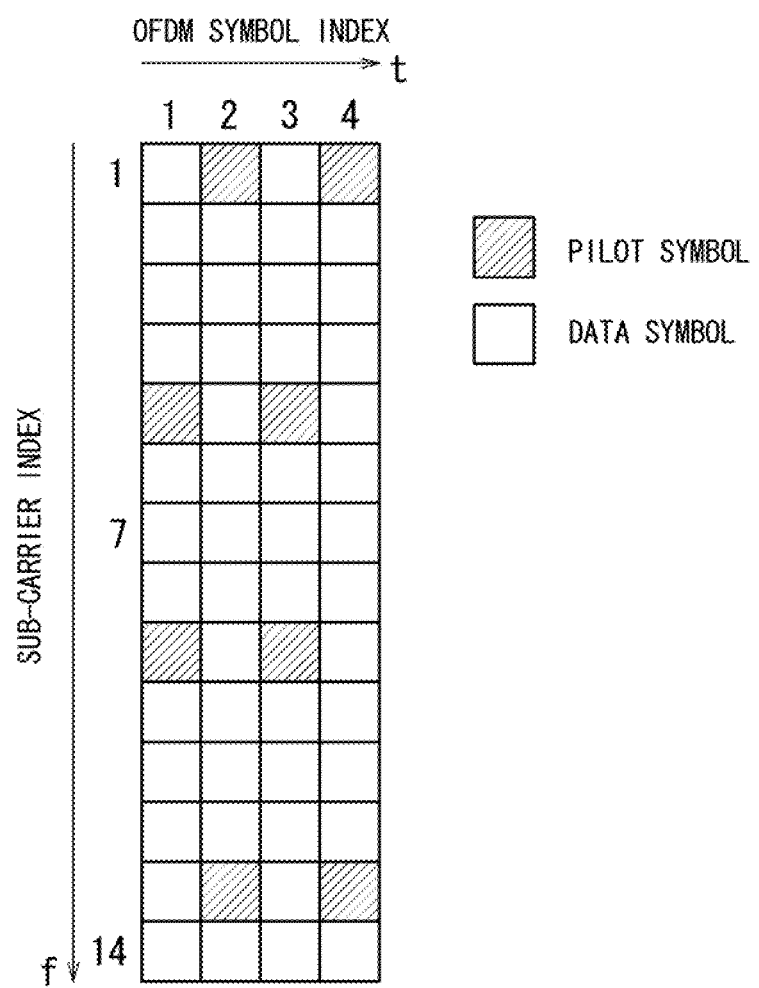
FIG. 2 is a diagram exemplifying a pilot arrangement in the OFDM scheme to explain an exemplary operation of the wireless communication apparatus shown in FIG. 1.

FIG. 2 is a diagram exemplifying a pilot arrangement in the OFDM scheme. In this example, in 14×4 symbols having 14 symbols (that is, 14 sub-carriers) in a direction of a frequency axis (f) and 4 symbols in a direction of a time axis (t), pilots are assigned respectively in OFDM symbol index 2, 4 with sub-carrier index 1, 13 and OFDM symbol index 1, 3 with sub-carrier index 5, 9.

In the wireless communication apparatus according to the present embodiment, channel characteristics of pilots are first estimated by the equalizers 13-1 to 13-M, and then the channel characteristics estimated are interpolated in data symbols in the direction of the time axis while, using the channel characteristic interpolated and the channel characteristics of pilots in the direction of the frequency axis, the channel characteristics are interpolated in data symbols in the direction of the frequency axis.

Thus, the equalizers 13-1 to 13-M extract the pilots first and estimate (calculate) the transmission channel characteristics of the extracted pilots using the following Expression (1).

$$H_{f,t}(a) = \frac{C_{f,t}(a)}{A_{f,t}(a)} \quad (0 < a < N_A) \tag{1}$$

f: sub-carrier index in which pilot is existent
t: OFDM symbol index in which pilot is existent
a: antenna index
$N_A$: the number of antennas Frequency response information $C_{f,t}(a)$ and $A_{f,t}(a)$ in the above expression (1) are calculated by the following expression (2).

$$\begin{cases} C_{f,t}(a) = x_{f,t}(a) r^*_{f,t} \\ A_{f,t}(a) = x_{f,t}(a) x^*_{f,t}(a) \end{cases} \tag{2}$$

$x_{f,t}$: complex input signal of (f,t) at antenna a
$r_{f,t}$: reference signal at (f,t)
*: complex conjugate After estimating the channel characteristics of respective pilots as above, the equalizers 13-1 to 13-M then perform linear interpolation on the channel characteristics of the data symbols in the direction of the time axis using the channel characteristics of the pilots arranged sequentially in the direction of the time axis, by the following expression (3).

$$Hd_{f,m}(a) = \left(1 - \frac{m}{N_T}\right) H_{f,t-1}(a) + \frac{m}{N_T} H_{f,t}(a) \quad (t-1 < m < t) \tag{3}$$

$N_T$: OFDM symbol interval between adjacent pilots

Then, the equalizers 13-1 to 13-M perform linear interpolation on the channel characteristics of data symbols in the direction of the frequency axis using the channel characteristics of pilots estimated in the direction of the time axis and the channel characteristics interpolated in data symbols, by the following expression (4).

Frequency ascending linear interpolation $$Hd_{n,t}(a) = \left(1 - \frac{m}{N_F}\right) H_{f-1,t}(a) + \frac{n}{N_F} H_{f,t}(a) \quad (f-1 < n < f) \tag{4}$$

$N_F$: sub-carrier interval between adjacent pilots

After estimating the channel characteristic of respective data symbols as above, the equalizers 13-1 to 13-M then perform channel equalization on the reception signals of the data symbols using results of estimation by the following expression (5) and provide the reception signals to the combining circuit 15.

$$y_{f,t}(a) = x_{f,t}(a) \cdot H^*_{f,t}(a) \tag{5}$$

Moreover, the equalizers 13-1 to 13-M calculate the received power, which is reliability information for respective symbols of corresponding antennas by the following expression (6) and provide results to the combining information calculation circuit 14.

$$Env_{f,t}(a) = HI_{f,t}^2(a) + HQ_{f,t}^2(a) \tag{6}$$

$HI_{f,t}(a)$: I component of Channel characteristic at (f, t) of antenna a
$HQ_{f,t}(a)$: Q component of Channel characteristic at (f, t) of antenna a Based on reliability information (received power) of respective antennas from the equalizers 13-1 to 13-M, the combining information calculation circuit 14 calculates antenna combined amplitude by the following expression (7) and provides the antenna combined amplitude calculated to the decode circuit 16. The combining information calculation circuit 14 also calculates the antenna reliability ratio for each antenna, which is a combining weight, by the following expression (8) based on the antenna combined amplitude calculated and amplitude of the received power of each antenna and provides the antenna reliability ratio calculated for each antenna to the combining circuit 15.

$$TotalAmp = \sum_{a=0}^{N_A} \sqrt{Env_{f,t}(a)} \quad (7)$$

$$RateEnv_{f,t}(a) = \frac{1}{TotalAmp \cdot \sqrt{Env_{f,t}(a)}} \quad (8)$$

The combining circuit 15, using the antenna reliability ratio of the corresponding antenna from the combining information calculation circuit 14 shown by the above expression (8), weights the reception signals after equalization compensation from the equalizers 13-1 to 13-M shown in the above expression (5) and diversity combines them to generate a combined reception signal by the following expression (9), and then provides the combined reception signal generated to the decode circuit 16.

$$y_{f,t} = \sum_{a=0}^{N_A} x_{f,t}(a) \cdot H_{f,t}^*(a) \cdot RateEnv_{f,t}(a) \quad (9)$$

Figure 3:
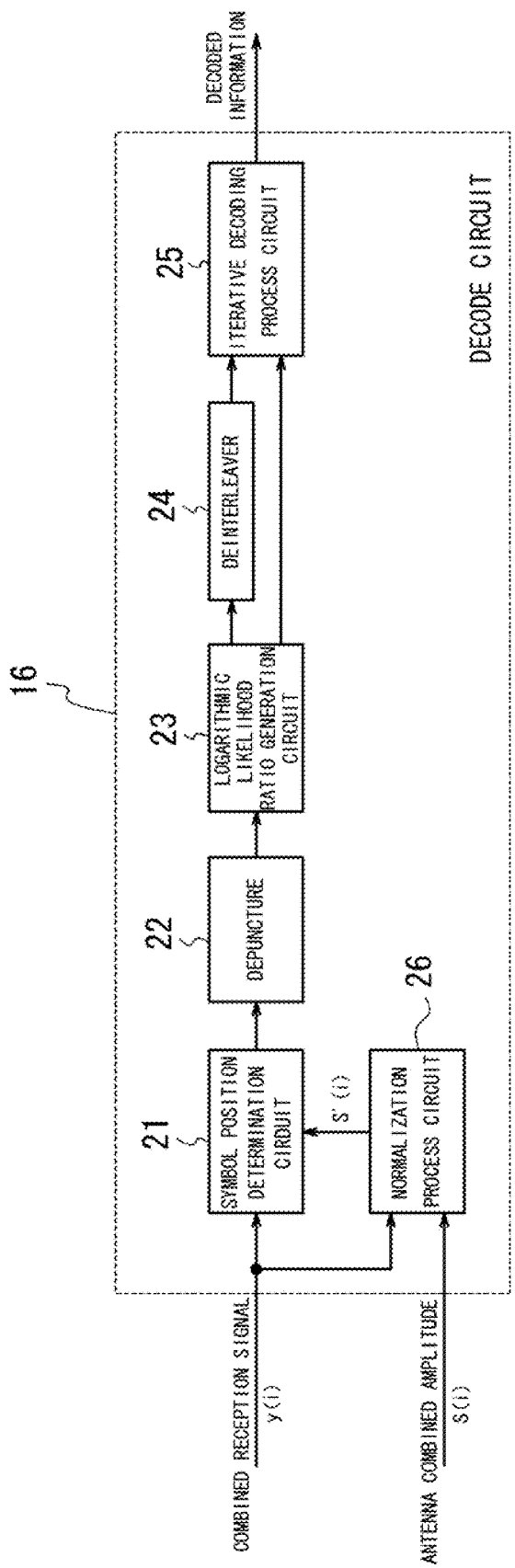
FIG. 3 is a functional block diagram illustrating a schematic configuration of a decode circuit shown in FIG. 1.

FIG. 3 is a functional block diagram illustrating a schematic configuration of the decode circuit 16. The decode circuit 16 constitutes a turbo decode circuit and is provided with a symbol position determination circuit 21, a depuncture 22, a logarithmic likelihood ratio generation circuit 23, a deinterleaver 24 and an iterative decoding process circuit 25. In the wireless communication apparatus of the present embodiment, the symbol position determination circuit 21 corrects the reliability adopted for soft decision on a symbol position of the combined reception signal y(i), based on the antenna combined amplitude (S(i)=TotalAmp) from the combining information calculation circuit 14, thereby improving the fading duration of the decoding process.

For this purpose, a normalization process circuit 26 is provided to the decode circuit 16 such that the normalization process circuit 26 inputs the combined reception signal y(i) output from the combining circuit 15 and the antenna combined amplitude S(i) output from the combining information calculation circuit 14, generates a normalized reliability S'(i), which is used to generate a corrected reliability by the symbol position determination circuit 21, and provides the normalized reliability S'(i) to the symbol position determination circuit 21.

Figure 4:
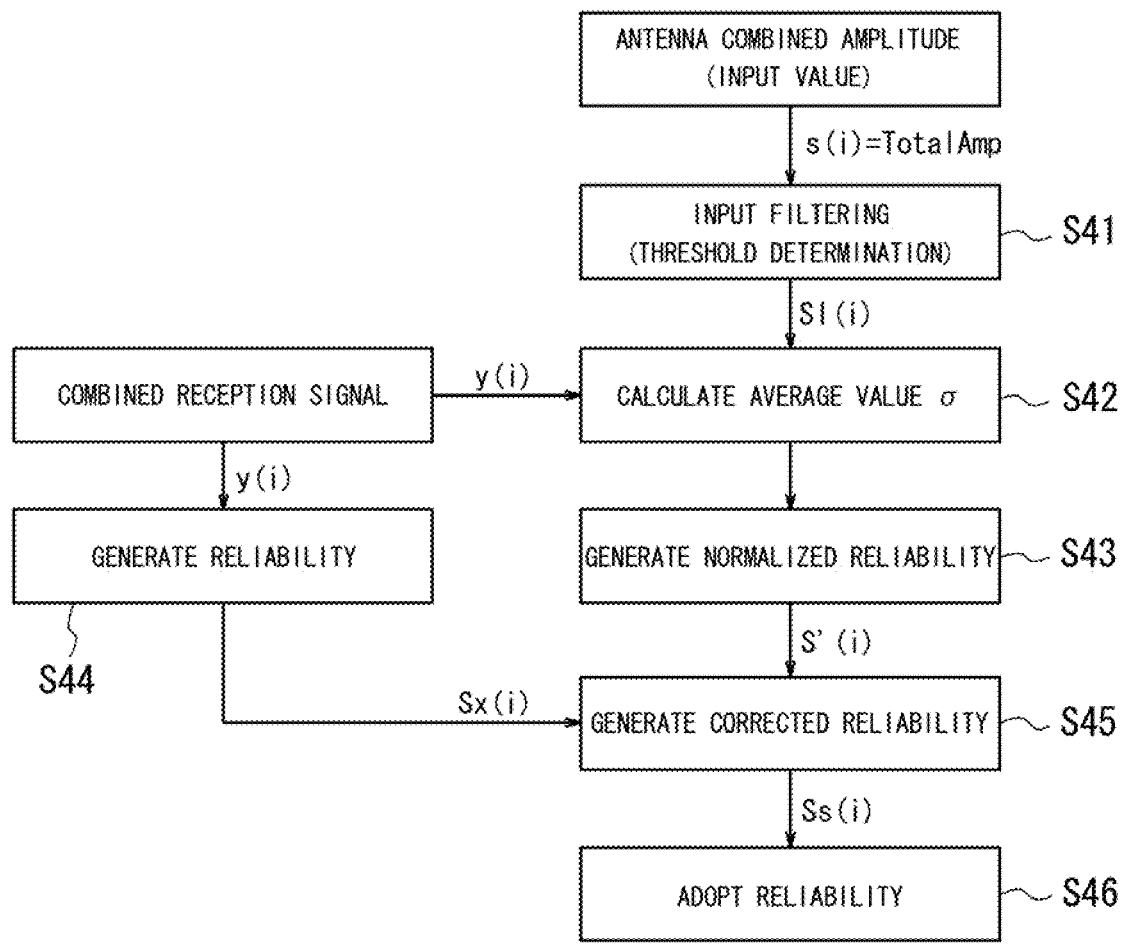
FIG. 4 is a flow chart showing a generation process of a corrected reliability by a normalization process circuit and a symbol position determination circuit shown in FIG. 3.

FIG. 4 is a flow chart showing a generation process of the corrected reliability by the normalization process circuit 26 and the symbol position determination circuit 21. In FIG. 4, steps S41 to S43 are performed by the normalization process circuit 26, while steps S44 to S46 are performed by the symbol position determination circuit 21.

Figure 5:
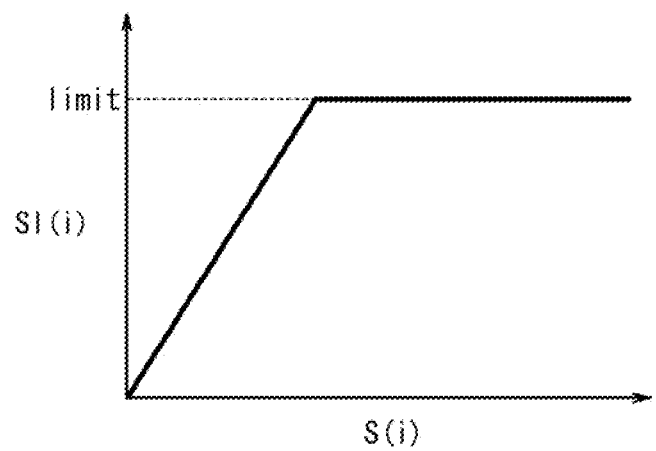
FIG. 5 is a graph showing a threshold characteristic used for determination of a threshold in a process of input filtering shown in FIG. 4.

When the antenna combined amplitude S(i) is input from the combining information calculation circuit 14, the normalization process circuit 26 first performs an input filtering process and determines a threshold S1(i) (step S41). The threshold S1(i) is determined from the antenna combined amplitude S(i) being input, based on a threshold characteristic shown in FIG. 5, for example.

The normalization process circuit 26 then calculates an average value σy(i) of the combined reception signal y(i) input from the combining circuit 15, as well as an average threshold σS1(i) of the threshold S1(i) (step S42). Next, the normalization process circuit 26 corrects the threshold S1(i), such that the calculated average value σy(i) and average threshold σS1(i) become approximately equal to each other, generates the normalized reliability S'(i) (step S43), and provides the symbol position determination circuit 21 therewith.

On the other hand, the symbol position determination circuit 21 calculates a reliability Sx(i) based on the combined reception signal y(i) input from the combining circuit 15 (step S44) and, based on the reliability Sx(i) calculated and the normalized reliability S'(i) provided from the normalization process circuit 26, generates corrected reliability Ss(i) by the expression, Ss(i)=S'(i)×Sx(i) (step S45). The symbol position determination circuit 21 then performs soft decision on reliability of information bits and parity bits adopting the corrected reliability Ss(i) generated (step S46) and provides a result of the decision (soft output) to the depuncture 22.

Thereafter, in the same manner as a conventional turbo decode circuit, the depuncture 22 inserts lost bits and performs soft decision for the reliability. In addition, the logarithmic likelihood ratio generation circuit 23 performs renormalization and likelihood ratio generation process and provides the result to the iterative decoding process circuit 25, as well as to the deinterleaver 24 to be deinterleaved and then provided to the iterative decoding process circuit 25. The decode circuit 16 thereby decodes and outputs the combined reception signal.

Figure 6:
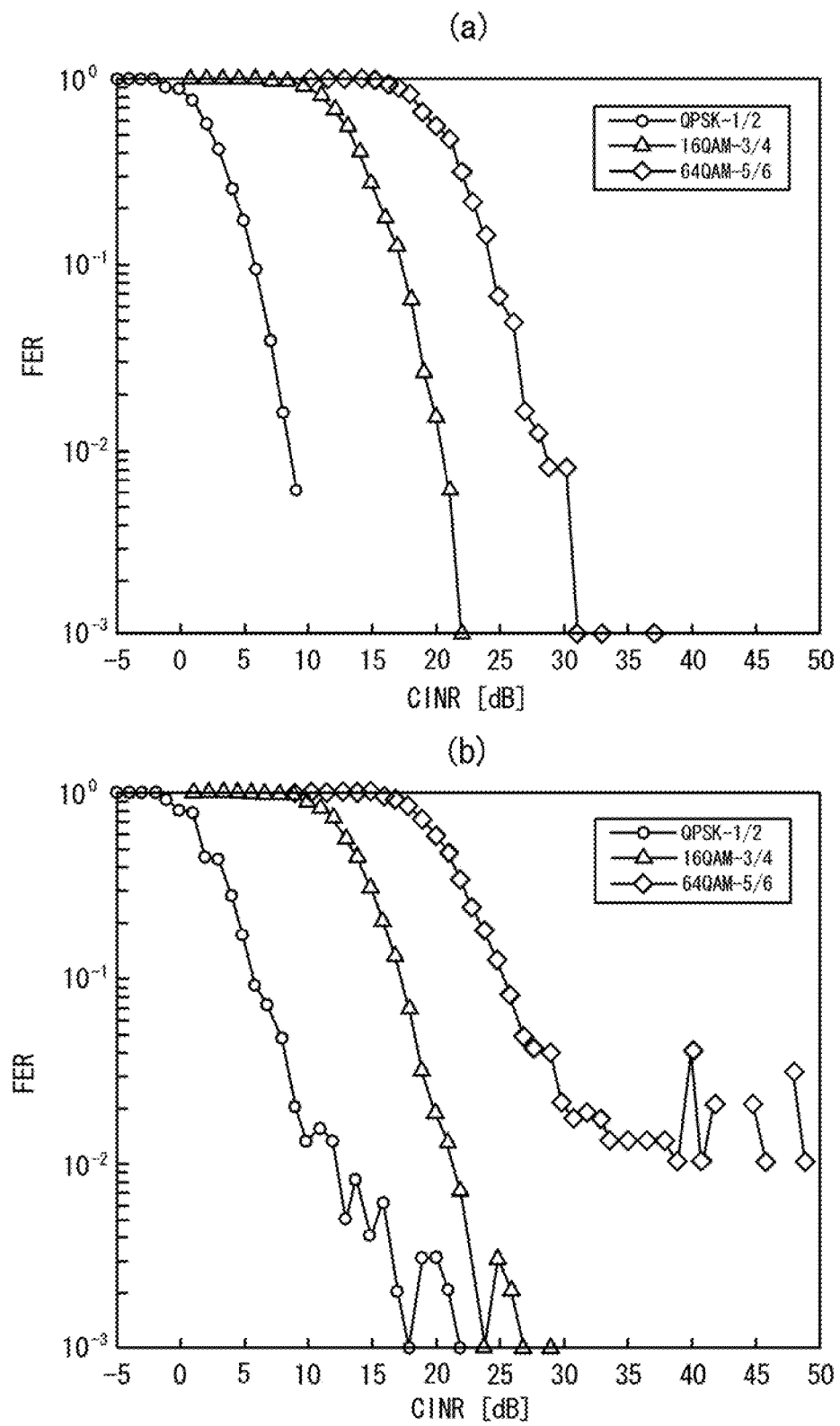
FIG. 6 is graphs showing by comparison simulation results of FER characteristics according to the wireless communication apparatus of the present embodiment and a conventional wireless communication apparatus.

FIG. 6 is graphs showing by comparison a simulation result of frame error (FER) characteristic when the combined reception signal is generated and the decoding process is performed thereon by the wireless communication apparatus according to the present embodiment and a simulation result of the frame error (FER) characteristic when the combined reception signal is generated and the decoding process is performed thereon adopting MMSE by a conventional wireless communication apparatus shown in FIG. 7. The simulation result in case of the wireless communication apparatus according to the present embodiment is shown in FIG. 6(*a*), while the simulation result in case of the conventional wireless communication apparatus is shown in FIG. 6(*b*). As conditions for the simulations, two reception antennas were used and Vehicular-A defined by ITU-R M.1225 was used as a delay model. The delay time by the model was approximately 2.4 μsec, and the vehicular speed at this point was 120 (km/h). The OFDM scheme is used as a communication method, and FER characteristics by modulation schemes of QPSK (Quadrature Phase Shift Keying), 16QAM and 64QAM are simulated. The code rates of QPSK, 16QAM and 64QAM are set to be ½, ¾ and ⅚, respectively.

As evidenced by FIG. 6, when multilevel modulation by 16QAM/64QAM is performed in the conventional wireless communication apparatus shown in FIG. 6(*b*), FER characteristic greatly deteriorates and FER value does not lowered even when input CINR (Carrier to Interference plus Noise Ratio) value becomes greater, which prevents from obtaining FER value equal to or less than $10^{-2}$ with which a stable reception condition can be obtained. Whereas, in the wireless communication apparatus according to the present embodiment shown in FIG. 6(*a*), the input CINR value is around 20 dB for 16QAM and the input CINR value is around 30 dB for 64QAM. Each of which enables to obtain FER value equal to or less than $10^{-2}$, it is thus possible to maintain a stable reception condition consistently.

In addition, in order to obtain FER value equal to or less than $10^{-2}$ by QPSK in the conventional wireless communication apparatus, the input CINR value around 15 dB is required, while the input CINR value only around 10 dB is required in the wireless communication apparatus according to the present embodiment.

As described above, according to the wireless communication apparatus according to the present embodiment, based on the received power corresponding to each of the plurality of antennas 11-1 to 11-M, that is, envelope information, the combining information calculation circuit 14 calculates the antenna reliability ratio, which is the combining weight, of each of the antennas. Then, based on the respective antenna reliability ratios calculated, the combining circuit 15 weights the reception signals of the corresponding antennas 11-1 to 11-M and diversity-combines them. With respect to the combined reception signal generated, the decode circuit 16 determines the symbol position and performs the decoding process by use of the antenna combined amplitude calculated by the combining information calculation circuit 14. Thereby, even when only a small number of reception antennas are used or when the multilevel modulation scheme is adopted as the modulation method, it is possible to improve the fading durability of the decoding process by reducing influence of the multipath fading caused by the delayed arrival waves, and thus maintains a stable reception condition consistently. Moreover, since there is no need to adopt estimation algorithm including inverse matrix calculation such as MMSE, it enables downsizing and cost down of hardware.

It is to be understood that the invention is not limited to the above embodiment but can be modified and changed in various manners. For example, the invention is widely applicable not only to the wireless communication apparatuses using the multicarrier modulation system such as OFDM scheme but also to the wireless communication apparatuses diversity-combining reception signals of a plurality of antennas. Moreover, even in a case to obtain the combined reception signal by MMSE, it is possible to correct the reliability from the equalizer 104 and perform the decoding process thereon by providing the antenna combined amplitude to the decode circuit 105 as shown in FIG. 7, for example. It is thus possible to improve the fading durability of the decoding process.

The invention claimed is:

1. A wireless communication apparatus having a plurality of antennas and for diversity-combining signals received by the plurality of antennas comprising:
    a calculation unit for calculating a total amplitude and combining weights based on the total amplitude and amplitude of received power of each antenna;
    a combining unit for generating a combined reception signal by weighting and combining signals received by the plurality of antennas based on the combining weights calculated by the calculation unit; and
    a decoding process unit for decoding the combined reception signal generated by the combining unit based on the total amplitude calculated by the calculation unit.

2. The wireless communication apparatus according to claim 1, wherein the calculation unit calculates an antenna reliability ratio of each antenna as the combining weight based on the total amplitude and amplitude of received power corresponding to each antenna.

3. The wireless communication apparatus according to claim 1, wherein the signals received by the plurality of antennas to be combined by the combining unit are multi-level-modulated signals.

4. The wireless communication apparatus according to claim 2, wherein the signals received by the plurality of antennas to be combined by the combining unit are multi-level-modulated signals.

5. The wireless communication apparatus according to claim 1, wherein the signals received by the plurality of antennas to be combined by the combining unit are orthogonal frequency-division multiplexed signals.

6. The wireless communication apparatus according to claim 2, wherein the signals received by the plurality of antennas to be combined by the combining unit are orthogonal frequency-division multiplexed signals.

7. The wireless communication apparatus according to claim 3, wherein the signals received by the plurality of antennas to be combined by the combining unit are orthogonal frequency-division multiplexed signals.

8. The wireless communication apparatus according to claim 4, wherein the signals received by the plurality of antennas to be combined by the combining unit are orthogonal frequency-division multiplexed signals.

9. A wireless reception method for diversity-combining signals received by a plurality of antennas comprising:
    calculating a total amplitude;
    calculating combining weights based on the total amplitude and amplitude of received power of each antenna;
    generating a combined reception signal by weighting and combining signals received by the plurality of antennas based on the combining weights; and
    decoding process step for decoding the combined reception signal based on the total amplitude.

* * * * *